(12) United States Patent
Phillips et al.

(10) Patent No.: US 7,214,111 B1
(45) Date of Patent: May 8, 2007

(54) POSITION SENSOR FOR A GEAR SHIFT ASSIST MECHANISM IN A MARINE PROPULSION DEVICE

(75) Inventors: George E. Phillips, Oshkosh, WI (US); Wayne M. Jaszewski, Jackson, WI (US); Gregory L. Fugar, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/518,814

(22) Filed: Sep. 11, 2006

(51) Int. Cl.
*B60L 1/14* (2006.01)
(52) U.S. Cl. ............................................. 440/2; 440/86
(58) Field of Classification Search ................ 440/2, 440/86
See application file for complete search history.

(56) References Cited

U.S. PATENT DOCUMENTS

| | | | |
|---|---|---|---|
| 3,580,278 A | 5/1971 | Bennett | 137/554 |
| 3,919,510 A | 11/1975 | Barnes | 200/61.88 |
| 3,919,964 A | 11/1975 | Hagen | 115/34 R |
| 4,958,138 A | 9/1990 | Hawranek et al. | 338/114 |
| 5,340,341 A | 8/1994 | Yoshimura | 440/61 |
| 5,475,591 A * | 12/1995 | Suzuki et al. | 701/98 |
| 5,488,860 A | 2/1996 | Speck et al. | 73/168 |
| 5,517,410 A * | 5/1996 | Nakagawa et al. | 701/51 |
| 5,545,108 A * | 8/1996 | Wagner et al. | 477/125 |
| 5,707,318 A * | 1/1998 | Shimei et al. | 477/133 |
| 5,921,888 A * | 7/1999 | Park | 477/131 |
| 6,015,365 A | 1/2000 | Kolb et al. | 477/103 |
| 6,659,911 B2 | 12/2003 | Suzuki et al. | 477/109 |
| 6,755,703 B1 | 6/2004 | Erickson | 440/75 |
| 6,840,888 B1 | 1/2005 | Winquist et al. | 477/83 |
| 6,845,683 B2 | 1/2005 | Tarui et al. | 74/335 |
| 2006/0065068 A1* | 3/2006 | Mizuno et al. | 74/473.1 |

* cited by examiner

*Primary Examiner*—Stephen Avila
(74) *Attorney, Agent, or Firm*—William D. Lanyi

(57) ABSTRACT

A shift assist mechanism is provided with a position identification device that incorporates one or more probes in association with one or more depressions that identify alignment between various positions on the piston and cylinder of the shift assist mechanism. Electrical conductivity or non-conductivity of three electrical conductors identifies the relative axial positions of these components. In addition, the electrical conductors of the system allow the detection of water within the lubricating oil of the transmission.

25 Claims, 5 Drawing Sheets

POSITION SENSOR FOR A GEAR SHIFT ASSIST MECHANISM IN A MARINE PROPULSION DEVICE

BACKGROUND OF THE INVENTION

1. Field of the Invention

The present invention is generally related to a position sensor and, more particularly, to a system by which the position of a shift assist mechanism can be accurately determined.

2. Description of the Related Art

Those skilled in the art of marine propulsion systems are aware of many different types of gear shift mechanisms. In addition, the skilled artisan is familiar with shift assist devices.

U.S. Pat. No. 3,580,278, which issued to Bennett on May 25, 1971, describes a fluid actuated transmission control. A pneumatic or hydraulic control mechanism for power shift transmissions of the type used in heavy duty power equipment, such as earth moving machines, cranes and material handling devices, marine equipment, deep well drilling rigs, and the like, is described. To control the movement of the range selector valve and insure proper function thereof when shifting from one transmission range to another, thus avoiding transmission failures, the system prevents faulty manual shifting.

U.S. Pat. No. 3,919,510, which issued to Barnes on Nov. 11, 1975, discloses an electrically controlled shift mechanism for marine propulsion units. An electric shift control for a sterndrive for a boat includes a pair of snap action switches conjointly controlling an electro-responsive hydraulic shift to place the gears in a neutral position, a forward drive position or a reverse drive position or condition. Each of the switches is a single pole, double throw unit having a movable spring-loaded contact pole with a pair of alternate positions engaging first and second fixed contacts. A first switch has the movable contact connected to a power supply and provides power to a first drive position contact or in the alternate to provide power to a power transfer contact connected to the movable contact of the second switch.

U.S. Pat. No. 3,919,964, which issued to Hagen on Nov. 18, 1975, describes a marine propulsion reversing transmission with hydraulic assist. The device comprises a reversing transmission located in a propulsion unit and connecting a drive shaft to a propeller shaft and shiftable between neutral, forward drive, and reverse drive condition, together with a mechanical linkage extending in the propulsion unit and connected to the reversing transmission for operating the reversing transmission in response to movement of the mechanical linkage, and a hydraulic arrangement actuated in response to initial movement of the mechanical linkage for assisting and moving the mechanical linkage to operate the reversing transmission.

U.S. Pat. No. 4,958,138, which issued to Hawranek et al. on Sep. 18, 1990, describes a resistive position indicator. The indicator has an elongated resistive element with an electrical terminal at each end and a tap which can be brought into contact with the resistive element. A contact point divides the resistive element into two portions and is movable along the resistive element, so that the resistance ratio between the two portions of the resistive element can be varied within wide limits.

U.S. Pat. No. 5,340,341, which issued to Yoshimura on Aug. 23, 1994, describes a power assisting mechanism for a marine propulsion unit. It comprises a single source of hydraulic power, a steered device, a gear shift member, steering and gear shift control mechanism connected to their respective members and first and second power assist devices connected to the gear shift and steering control mechanism for power assist. A single substantially constant output hydraulic pump supplies an essential contact level of fluid power for the first and second power assist devices to assist the operator in controlling the steering and gear shift controls.

U.S. Pat. No. 5,488,860, which issued to Speck et al. on Feb. 6, 1996, describes an apparatus for determining the position of a piston in a fluidic actuator. Apparatus for determining the position of a piston in a hydraulically or pneumatically operated actuator including a fixed position, rotatable shaft having a pair of attached pins, each pin offset from the center of the shaft is described. The pins are positioned on either side of a drive ring located about the circumference of the piston. When the piston moves in either direction, one of the pair of pins will remain in contact with the drive ring and cause unidirectional rotation of the shaft. In order to detect piston position, a sensor is mounted to detect shaft rotation.

U.S. Pat. No. 6,015,364, which issued to Kolb et al. on Jan. 18, 2000, describes electronic gear shift assist circuitry. The circuit for reducing the clutch wear of a transmission on a marine propulsion system during the shift process by anticipating the probable shifting forces and providing an ignition kill signal before the shift forces can build to an unacceptable level is described.

U.S. Pat. No. 6,659,911, which issued to Suzuki et al. on Dec. 9, 2003, describes a shift assist system for an outboard motor. The system regulates the torque of the engine to ensure proper effortless shifting. The system recognizes open circuit or short circuit faults and nevertheless enables the torque of the engine to be reduced to facilitate easy gear selection.

U.S. Pat. No. 6,755,703, which issued to Erickson on Jun. 29, 2004, discloses a hydraulically assisted gear shift mechanism for a marine propulsion device. The mechanism provides a hydraulic cylinder and piston combination connected by a linkage to a gear shift mechanism. Hydraulic pressure can be provided by a pump used in association with either a power trim system or a power steering system. Hydraulic valves are used to pressurize selected regions of the hydraulic cylinder in order to actuate a piston which is connected, by an actuator, to the gear shift mechanism.

U.S. Pat. No. 6,840,888, which issued to Winquist et al. on Jan. 11, 2005, describes hydraulic-electronic control systems for marine vessels. The systems and methods for controlling shift and throttle of an electronically controlled power train are described. The system includes a throttle or shift controller having an operating range. A hydraulic slave is in fluid communication with the controller such that a movement of the controller within its operating range causes a flow or displacement of fluid between the controller and the hydraulic slave. The hydraulic slave has a shaft that rotates in response to the fluid flow between the controller and the hydraulic slave.

U.S. Pat. No. 6,845,683, which issued to Tarui et al. on Jan. 25, 2005, describes a shifting transfer mechanism. The mechanism includes a limit switch that sends an open-close signal of the switch contacts out to a control mechanism according to a shifting sequence. The shift contacts detect the position of a slider which is moved by a thrust actuator, during shifting in the range of 4H engagement to the range of N engagement. Therefore, if one of the switch contacts is faulty, the other switch detects shifting between 4H and N.

The patents described above are hereby expressly incorporated by reference in the description of the present invention.

In marine propulsion systems that utilize a shift assist mechanism, such as a hydraulically actuated piston, it would be significantly beneficial if a simple and compact position sensing system could be incorporated to determine the position of the shift assisting mechanism within the range of forward, neutral, and reverse positions.

SUMMARY OF THE INVENTION

A position detector for a shift assist mechanism, made in accordance with a preferred embodiment of the present invention, comprises a first component having a first surface and a second component having a second surface. The first and second surfaces are movable relative to each other. In one embodiment of the present invention, the first component is a piston-like device that is slidable within the second component which is a cylinder-like device. The primary purpose of the present invention is to accurately determine the position of the first component relative to the second component.

A preferred embodiment of the present invention further comprises a depression formed in the first surface and a first probe movable supported by the second component. The first probe is movable with respect to the first surface and at least partially movable into the first depression when the first probe and the first depression are aligned with each other. The first probe and the first depression are configured to cooperate with each other to provide a first electrically conductive characteristic when the first probe is in the first depression and a second electrically conductive characteristic when the first probe is in contact with the first surface. The first and second electrically conductive characteristics are measurably distinct from each other. As a result, alignment or non-alignment of the first probe and the first depression with each other can be determined as a function of the first and second electrically conductive characteristics.

In one embodiment of the present invention, it further comprises second and third probes. The second and third probes operate in a manner generally similar to the first probe operation described above. In each case, alignment of the first, second, or third probes with the first depression can be determined as a result of the first and second electrically conductive characteristics associated with each of the probes.

In an alternative embodiment of the present invention, second and third depressions are formed and positioned so that the first probe can move into them. The first and second electrically conductive characteristics allow the determination of which, if any, of the depressions is aligned with the first probe.

In a particularly preferred embodiment of the present invention, the first and second electrically conductive characteristics relate to the conductivity or non-conductivity between contacts associated with the first and second components.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
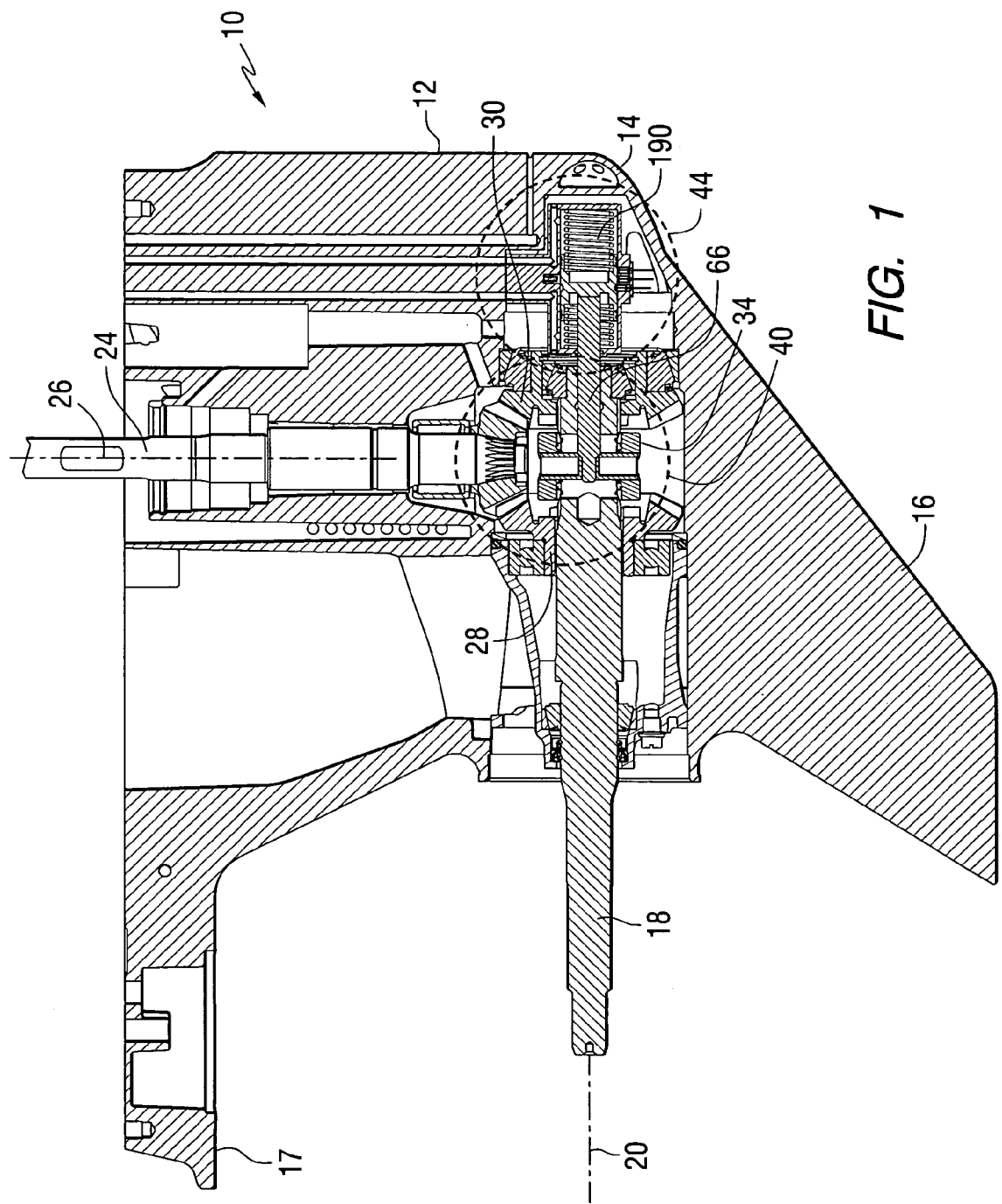
FIG. 1 is a side section view of a marine propulsion device.

Throughout the description of the preferred embodiment of the present invention, like components will be identified by like reference numerals.

FIG. 1 is a side section view of a marine propulsion device 10. The illustration of FIG. 1 shows the driveshaft housing 12, the gear case 14, the skeg 16, the cavitation plate 17, and the propeller shaft 18. The propeller shaft 18 is supported by the gear case 14 for rotation about a propeller shaft axis 20. A driveshaft 24 is supported for rotation about a driveshaft axis 26. A bevel gear attached to the bottom portion of the driveshaft 24 is disposed in threaded engagement with forward and reverse bevel gears, 28 and 30, which rotate about the propeller shaft axis 20. A dog clutch 34 is axially movable in a direction parallel to the propeller shaft axis 20 to selectively engage either the forward or reverse bevel gears, 28 or 30, with the propeller shaft 18. Dashed circle 40 identifies the components associated with the transmission that facilitate the selection of forward, neutral, and reverse gear relationships between the driveshaft 24 and the propeller shaft 18. Dashed circle 44 identifies the components associated with a shift assist mechanism that is related to the present invention.

Figure 2:
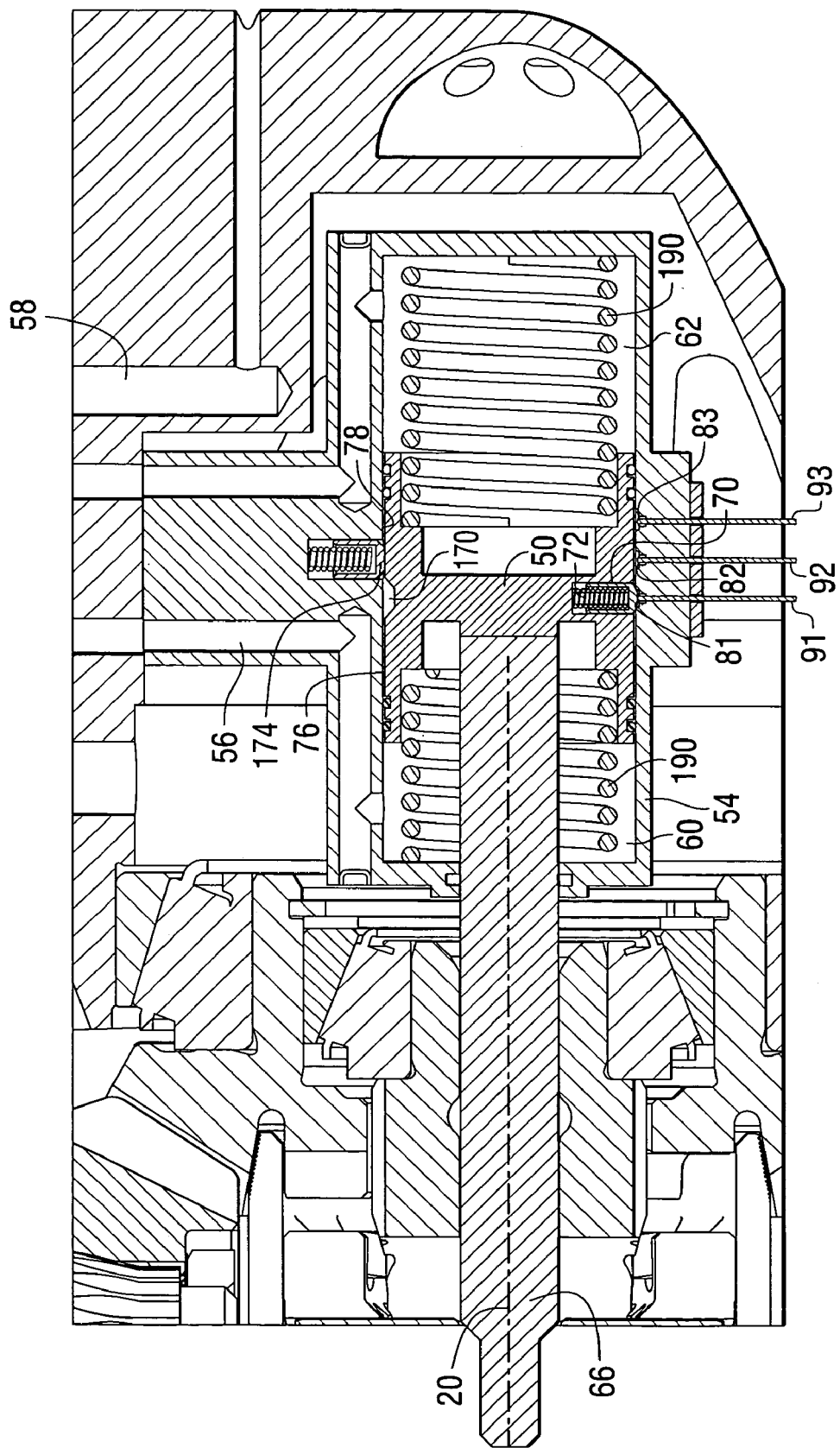
FIG. 2 shows one embodiment of the present invention.

FIG. 2 is an enlarged version of a shift assist mechanism that performs the function of moving the dog clutch 34 as described above in conjunction with FIG. 1. The shift mechanism illustrated in FIG. 2 is capable of performing the function described above in conjunction with the components in the dashed circle 44 of FIG. 1. A piston member 50 is slidably disposed within a cylinder member 54. Two hydraulic conduits, 56 and 58, are provided to allow pressurized hydraulic fluid to be selectively introduced into the cavities identified by reference numerals 60 and 62, respectively. The differential pressure between these cavities, 60 and 62, urges the piston 50 either toward the left or right in FIG. 2. The shaft 66 is attached to the piston 50 and is configured to urge the dog clutch 34, described above, in a direction either toward the left or right. In this way, the axial movement of the piston 50 causes the dog clutch 34 to move into a forward, neutral, or reverse gear position. The operation of the dog clutch 34 and the associated bevel gears which connect the driveshaft 24 to the propeller shaft 18, as described above in conjunction with FIG. 1, will not be described in detail herein because of the familiarity of those skilled in the art of marine propulsion systems with these components and their operation.

It is important to determine the position of the piston 50 relative to the cylinder 54. Several embodiments of the present invention provide this information.

Figure 3:
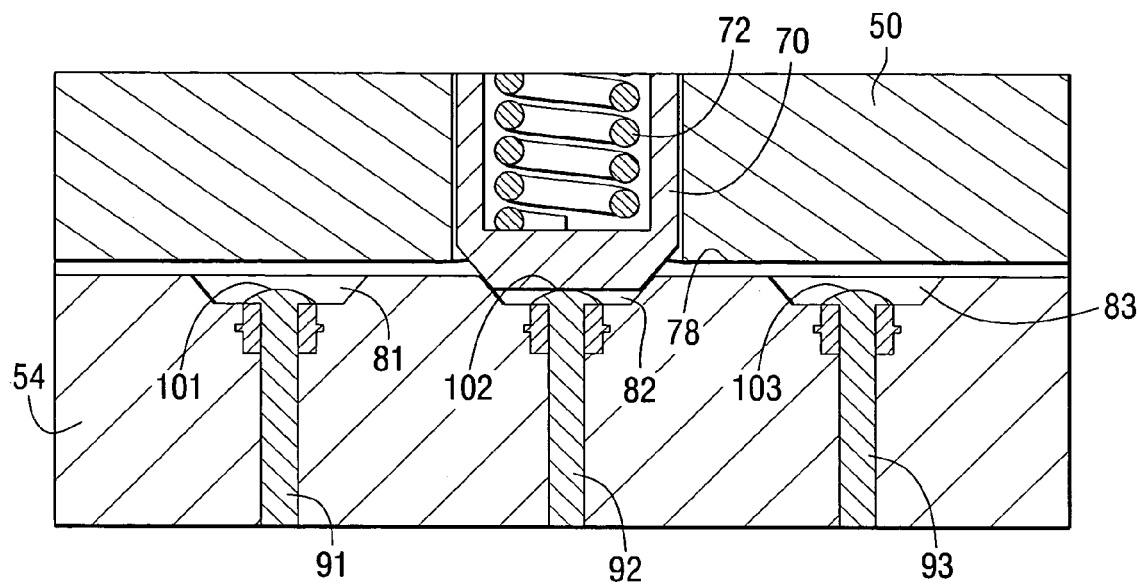
FIG. 3 is an enlargement of a portion of FIG. 2.

FIG. 3 is an enlarged view of the lower central portion of FIG. 2. A probe 70 is movably supported by the piston 50 and a spring 72 urges the probe 70 in a downward direction toward the cylinder 54. The piston 50 has a piston surface 76 and the cylinder 54 has a cylinder surface 78. These two surfaces, 76 and 78, are disposed in sliding contact with each other. As illustrated in FIG. 3, the probe 70 can be extended past the piston surface 76 toward the cylinder surface 78 and is urged in that direction by the spring 72.

With continued reference to FIG. 3, first 81, second 82, and third 83 depressions are formed in the surface 78 of the cylinder 54. These depressions are shaped and configured to allow the probe 70 to move into them when they are aligned with the probe. In FIG. 3, the probe 70 is shown extending into the second depression 82. First 91, second 92, and third 93 electrical contacts are supported by the cylinder 54 with conductive ends, 101–103, disposed in the depressions, respectively. When the probe 70 moves downwardly into a depression, electrical contact occurs between the tip of the probe 70 and the associated electrical contact. As an example, in FIG. 3 the probe 70 is disposed partially within the second depression 82 and in contact with the second contact 102. The electrical contact between the probe 70 and the second electrical contact 92 as a result of physical contact between the tip of the probe 70 and the second end 102. This electrical contact allows the position of the probe 70 to be identified, relative to the three depressions, 81–83. As a result, the position of the piston 50 relative to the cylinder 54 can be identified. In a typical arrangement of the transmission and shift assist mechanism, the position illustrated in FIG. 3 would indicate that the piston 50 is in the neutral gear position. If the probe 70 was disposed within the first depression 81, this relative position of the piston 50 and the cylinder 54 would indicate that the transmission has been moved into the forward gear position. The piston 50 illustrated in FIG. 2 is in the forward gear position as indicated by the presence of the probe 70 in the first depression 81 and in electrical contact with the first electrical lead 91.

Figure 4:
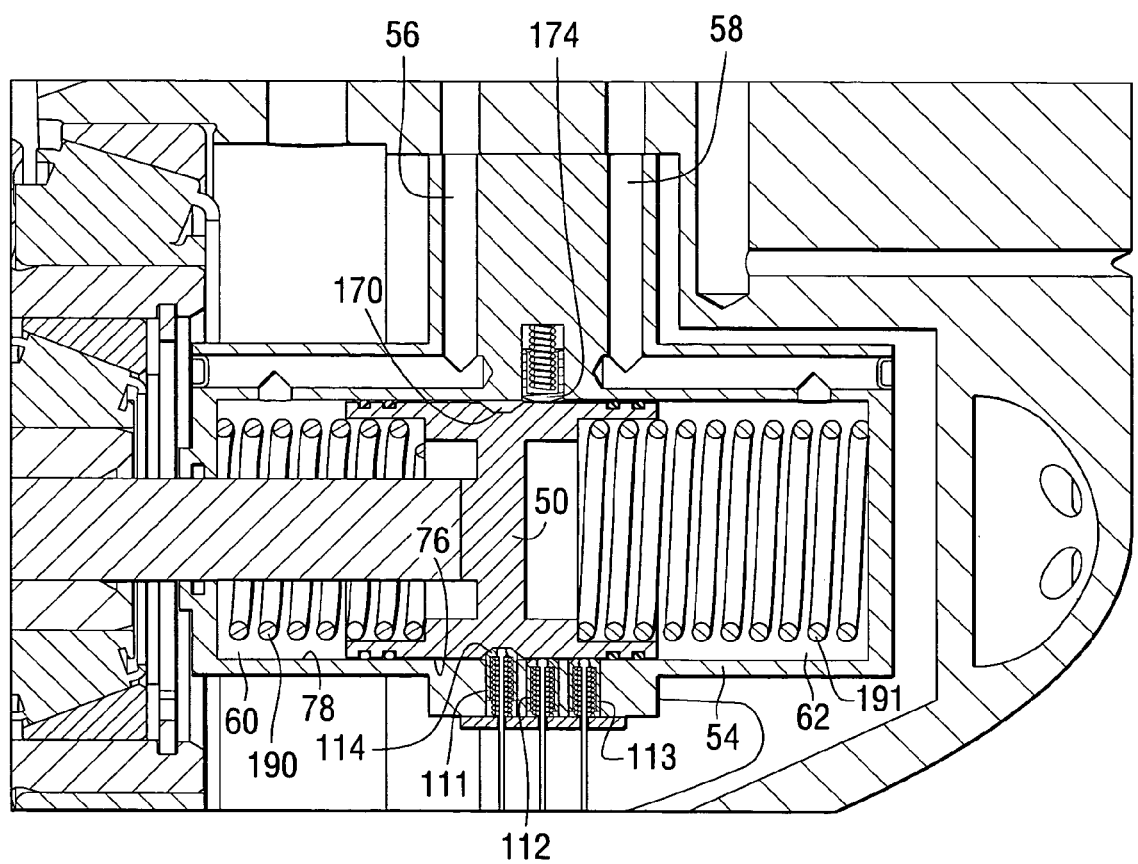
FIG. 4 shows an alternative embodiment of the present invention.

FIG. 4 shows an alternative embodiment of the present invention. It comprises first, second, and third probes, 111–113, supported by the cylinder 54. A depression 114 is formed in the piston surface 76. All three probes, 111–113, are urged by associated springs to move upwardly in FIG. 4 against the piston surface 76. When the depression 114 is aligned with one of the probes, that probe moves into the depression 114.

Figure 5:
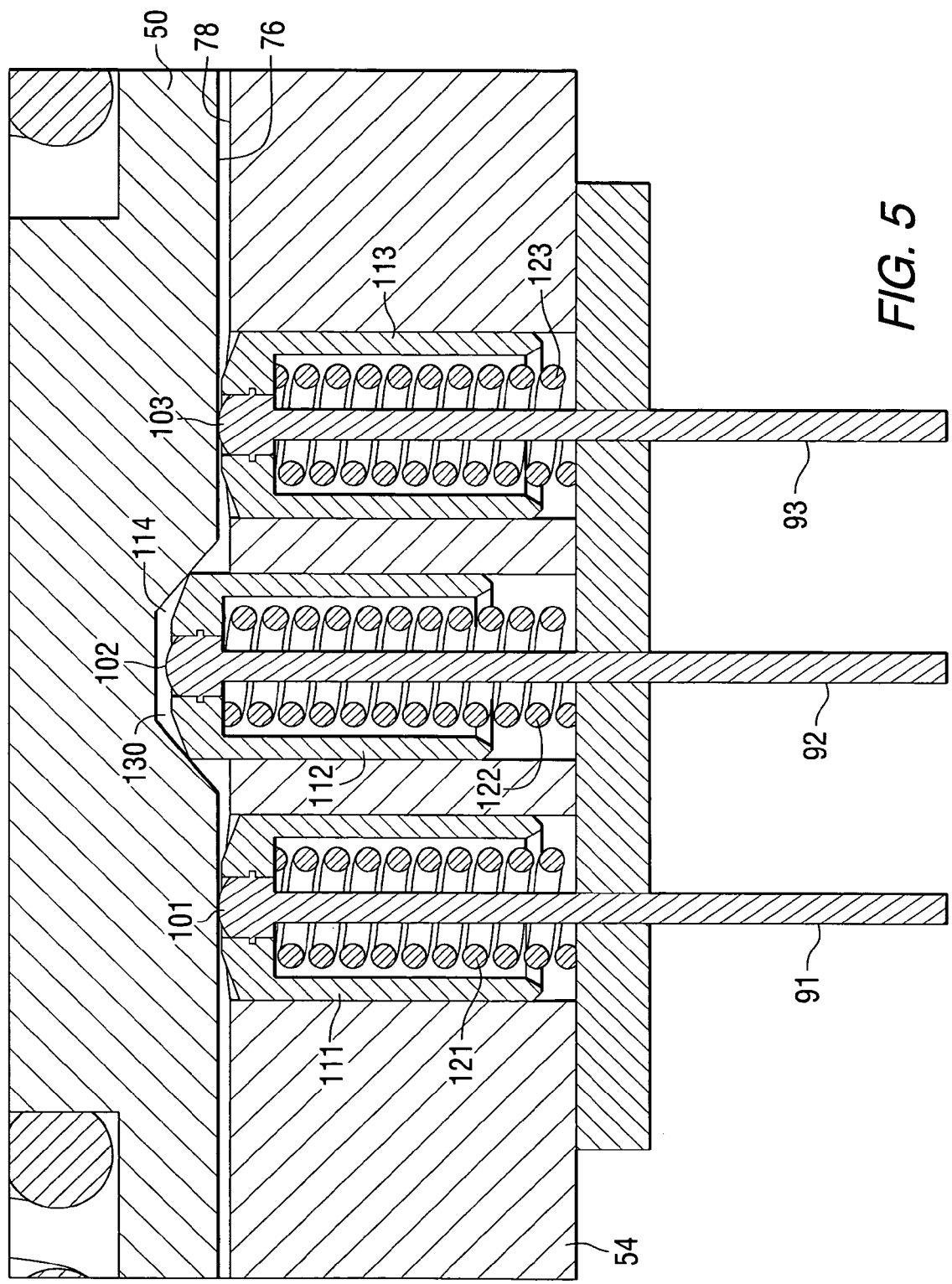
FIG. 5 is an enlargement of a portion of FIG. 4.

FIG. 5 is an enlarged view of FIG. 4, showing the three probes and the depression 114. As can be seen, the three electrical contacts, 91–93, are supported by their associated probes, 111–113, respectively. The springs, 121–123, urge the associated probes upward into contact with the piston surface 76 or, as illustrated with respect to the second probe 112, into the depression 114. When the probe 112 is inserted into the depression 114, a space 130 exists between the tip 102 of the second electrical conductor 92 and the conductive surface at the bottom of the depression 114 as illustrated in FIG. 5. This provides an open circuit between the second electrical conductor 92 and the piston 50. This electrically conductive status relating to the second probe 112 and its associated second electrical conductor 92 can be distinguished from the electrical condition of the other two electrical conductors, 91 and 93. The first and second tips, 101 and 103, of the first and second electrical conductors, 91 and 93, are in electrically conductive contact with the piston surface 76. In various ways that are known to those skilled in the art, the conductive or non-conductive status of the three electrical conductors, 91–93, can therefore be used to determine which probe, 111–113, is within the depression 114. As a result, this information allows the determination of the axial position of the piston 50 in relation to the cylinder 54.

Figure 6:
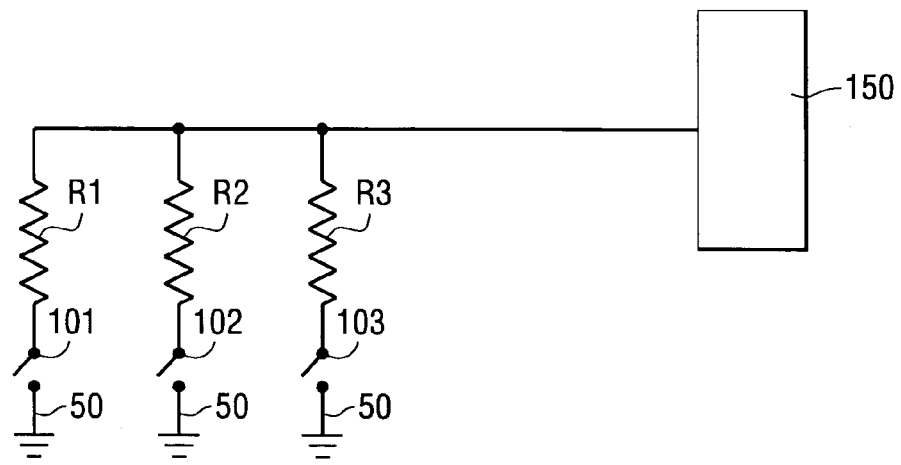
FIG. 6 is a simplified electrical schematic of one potential detection circuit that can be associated with a preferred embodiment of the present invention.

FIG. 6 is a simplified representation of a microprocessor 150 connected in signal communication with three resistors, R1, R2, and R3 which are, in turn, connected to switches that represent the distal ends, 101–103, of the electrical conductors, 91–93. Whether or not these distal ends are in contact with the piston 50 determines whether or not a closed circuit exists between any of the electrical conductors and the microprocessor 115. If the magnitudes of the resistors, R1–R3, are effectively chosen, the total resistance measured by the microprocessor 150 will determine if any of the probes, 111–113, is within the depression 114 and which one is in the depression. Similarly, the type of circuit illustrated in FIG. 6 can be used in conjunction with the embodiment of the present invention described above in conjunction with FIGS. 2 and 3, wherein each depression, 81–83, is provided with a distal end, 101–103, of an associated electrical conductor, 91–93. It should be understood that many different types of simple circuits, such as that illustrated in FIG. 6, can be used to determine which of the electrical conductors is in physical contact with the other of the components of the piston/cylinder arrangement described above.

With continued reference to FIGS. 1–6, it can be seen that all of the various embodiments of the present invention allow a determination to be made regarding the position of the piston 50 relative to the cylinder 54 of the shift assist mechanism 44. As such, this determination also identifies the position of the attached dog clutch 34 which selects the forward, neutral, and reverse gear positions of the marine propulsion device 10. One specific embodiment of the present invention is illustrated in FIGS. 2 and 3 and another embodiment is illustrated in FIGS. 4 and 5. These embodiments exhibit various common characteristics. As an example, all of these embodiments use one or more probes that are movable, under the urging of a spring, into one or more depressions. They also utilize the concept of providing recognizably distinct electrical characteristics (e.g. conducting or non-conducting) associated with the three electrical conductors, 91–93.

With continued reference to FIGS. 1–6, the piston can also be provided with an additional depression 170 in the piston surface and an additional probe 174 supported by the cylinder 54. This additional probe 174, as illustrated in FIGS. 2 and 4, provides a mechanical detent that facilitates the location of the piston 50 at the neutral gear position relative to the cylinder 54. With continued reference to FIGS. 1–6, the embodiments of the present invention described above comprise a first component having a first surface and a second component having a second surface. These components are illustrated and described above as the piston 50 and cylinder 54. The surfaces are described above and identified by reference numerals 76 and 78. First, second and third electrical contacts, 91–93, are disposed at first, second, and third locations of one of the first and second surfaces. A fourth location on the other surface is configured to cause one of the three electrical contacts 91–93, to exhibit an electrical characteristic which is recognizably distinct from the other two of the electrical contacts. As a result, the relative positions of the first and second components can be uniquely identified as a function of the electrical characteristic of three electrical conductors, 91–93. As an example, if electrical continuity is sensed with regard to the first electrical conductor 91, but not the second and third electrical conductors, the probe is in the position illustrated in FIG. 2. On the other hand, if the electrical characteristic of the second electrical conductor 92 is indicative of electrical continuity, but the first and third electrical conductors are not, the probe is in the position shown in FIG. 3. If electrical conductivity is sensed in conjunction with the second and third electrical conductors, but not the first, the piston 50 is in the position illustrated in FIG. 4. On the other hand, if the first and third electrical conductors exhibit electrical continuity, but the second one does not, the piston 50 is in the position shown in FIG. 5. It can be seen that the present invention provides a simple and robust device that identifies the position of the piston in relation to the cylinder.

Another advantage of the present invention allows the determination to be made that water has entered the space surrounding the transmission and shift assist mechanism illustrated in FIG. 1. It is expected that the space surrounding the bevel gears, the piston, the cylinder, and the dog clutch will be filled with lubricating oil. If water enters this area, damage can eventually occur because of its adverse affect on the lubricity of the liquid within this cavity. Since water is significantly more electrically conductive than lubricating oil, the presence of water can create current paths between the electrical conductors, 91–93, that would normally not occur unless a conductive liquid was present in the vicinity of the conductive tips of those electrical leads. If the microprocessor senses that there is electrical conductivity between two or more of these electrical conductors, a conclusion can be drawn that water is present with the oil in the cavity surrounding the transmission and shift assist mechanism. This characteristic of the present invention provides an additional advantage beyond the identification of the axial position of the piston in relation to the cylinder.

With continued reference to FIGS. 1–6, two centering springs 190 are provided to exert forces on the piston 50 which cause it to move toward a central, or neutral gear, position when the hydraulic pressure in conduits 56 and 58 and in spaces 60 and 62 are generally equal. In addition, the centering springs 190 tend to exert equalizing forces on the piston 50 which induce the hydraulic fluid to flow out of the space, 60 or 62, that previously had a higher pressure than the other space. The piston 50, as it returns toward a central or neutral position, causes this hydraulic fluid on both sides of the piston to equalize in both volume and pressure.

Although the present invention has been described with considerable specificity and illustrated to show various embodiments, it should be understood that alternative embodiments are also within its scope.

We claim:

1. A position detector for a shift assist mechanism, comprising:
   a first component having a first surface;
   a second component having a second surface, said first and second surfaces being movable relative to each other;
   a first depression formed in said first surface; and
   a first probe movably supported by said second component, said first probe being movable with respect to said first surface and at least partially movable into said first depression when said first probe and said first depression are aligned with each other, said first probe and said first depression being configured to cooperate with each other to provide a first electrically conductive characteristic when said first probe is in said first depression and a second electrically conductive characteristic when said first probe is in contact with said first surface, said first and second electrically conductive characteristics being measurably distinct from each other, whereby alignment or nonalignment of said first probe and said first depression with each other can be determined as a function of said first and second electrically conductive characteristics.

2. The position detector of claim 1, further comprising:
   a second probe movably supported by said second component, said second probe being movable with respect to said first surface and at least partially movable into said first depression when said second probe and said first depression are aligned with each other, said second probe and said first depression being configured to cooperate with each other to provide said first electrically conductive characteristic when said second probe is in said first depression and said second electrically conductive characteristic when said second probe is in contact with said first surface, said first and second electrically conductive characteristics being measurably distinct from each other, whereby alignment or nonalignment of said second probe and said first depression with each other can be determined as a function of said first and second electrically conductive characteristics.

3. The position detector of claim 2, further comprising:
   a third probe movably supported by said second component, said third probe being movable with respect to said first surface and at least partially movable into said first depression when said third probe and said first depression are aligned with each other, said third probe and said first depression being configured to cooperate with each other to provide said first electrically conductive characteristic when said third probe is in said first depression and said second electrically conductive characteristic when said third probe is in contact with said first surface, said first and second electrically conductive characteristics being measurably distinct from each other, whereby alignment or nonalignment of said third probe and said first depression with each other can be determined as a function of said first and second electrically conductive characteristics.

4. The position detector of claim 1, further comprising:
   a second depression formed in said first surface; and
   said first probe being at least partially movable into said second depression when said first probe and said second depression are aligned with each other, said first probe and said second depression being configured to cooperate with each other to provide a first electrically conductive characteristic when said first probe is in said second depression and a second electrically conductive characteristic when said first probe is in contact with said first surface, said first and second electrically conductive characteristics being measurably distinct from each other, whereby alignment or nonalignment of said first probe and said second depression with each other can be determined as a function of said first and second electrically conductive characteristics.

5. The position detector of claim 4, further comprising:
   a third depression formed in said first surface; and
   said first probe being at least partially movable into said third depression when said first probe and said third depression are aligned with each other, said first probe and said third depression being configured to cooperate with each other to provide a first electrically conductive characteristic when said first probe is in said third depression and a second electrically conductive characteristic when said first probe is in contact with said first surface, said first and second electrically conductive characteristics being measurably distinct from each other, whereby alignment or nonalignment of said first probe and said third depression with each other can be determined as a function of said first and second electrically conductive characteristics.

6. A position detector for a shift assist mechanism, comprising:
   a first component having a first surface;

a second component having a second surface, said first and second surfaces being movable relative to each other;

first, second, and third electrical contacts disposed at first, second, and third locations of said first surface;

a fourth location on said second surface configured to cause one of said first, second, and third electrical contacts to exhibit an electrical characteristic which is recognizably distinct from the other two of said first, second, and third electrical contacts; and whereby the relative position of said first and second components is uniquely identified as a function of the one of said first, second, and third electrical contacts exhibiting said electrical characteristic which is recognizably distinct from the other two of said first, second, and third electrical contacts.

7. The position detector of claim 6, wherein:

said first component is generally cylindrical and slidably disposed within a generally cylindrical opening in said second component.

8. The position detector of claim 6, further comprising:

first, second, and third depressions formed at said first, second, and third locations on said first surface, said first, second, and third electrical contacts each being disposed within one of said first, second, and third depressions.

9. The position detector of claim 8, wherein:

each of said first, second, and third depressions comprise a groove formed in said first surface.

10. The position detector of claim 8, further comprising:

a resilient electrical conductor supported by said second component for selective movement into said first, second or third depressions and make electrical contact with one of said first, second, and third electrical contacts as a function of the relative position of said first and second components.

11. The position detector of claim 6, further comprising:

first, second, and third resilient members supported by said first component, said first, second, and third electrical contacts being attached, respectively to said first, second, and third resilient members; and a depression formed in said second surface, each of said first, second, and third electrical contacts being movable out of electrical contact with said second surface as a function of its associated one of said first, second, and third resilient members being moved into said depression to identify one of first, second, and third positions of said second component relative to said first component.

12. The position detector of claim 11, wherein:

said depression comprises a groove formed in said first surface.

13. The position detector of claim 6, wherein:

said first component is a piston slidably disposed within a cylindrical opening formed within said second member, said piston being movable in response to differential liquid pressure within said cylindrical opening on opposite sides of said piston.

14. The position detector of claim 13, wherein:

said piston is configured to exert a force on a shifting mechanism of a marine propulsion device.

15. The position detector of claim 14, further comprising:

a spring structure connected to said piston and configured to urge said piston to a central position wherein said fourth location on said second surface is generally aligned with said second location.

16. A position detector for a shift assist mechanism, comprising:

a first component having a first surface;

a second component having a second surface, said first and second surfaces being movable relative to each other;

first, second, and third electrical contacts disposed at first, second, and third locations of said first surface;

a fourth location on said second surface configured to cause one of said first, second, and third electrical contacts to exhibit an electrical characteristic which is recognizably distinct from the other two of said first, second, and third electrical contacts;

whereby the relative position of said first and second components is uniquely identified as a function of the one of said first, second, and third electrical contacts exhibiting said electrical characteristic which is recognizably distinct from the other two of said first, second, and third electrical contacts;

first, second, and third depressions formed at said first, second, and third locations on said first surface, said first, second, and third electrical contacts each being disposed within one of said first, second, and third depressions; and a resilient electrical conductor supported by said second component for selective movement into said first, second or third depressions and make electrical contact with one of said first, second, and third electrical contacts as a function of the relative position of said first and second components.

17. The position detector of claim 16, wherein:

said first component is generally cylindrical and slidably disposed within a generally cylindrical opening in said second component.

18. The position detector of claim 17, wherein:

each of said first, second, and third depressions comprise a groove formed in said first surface.

19. The position detector of claim 16, wherein:

said first component is a piston slidably disposed within a cylindrical opening formed within said second member, said piston being movable in response to differential liquid pressure within said cylindrical opening on opposite sides of said piston, said piston being configured to exert a force on a shifting mechanism of a marine propulsion device.

20. The position detector of claim 19, further comprising:

a spring structure connected to said piston and configured to urge said piston to a central position wherein said fourth location on said second surface is generally aligned with said second location.

21. A position detector for a shift assist mechanism, comprising:

a first component having a first surface;

a second component having a second surface, said first and second surfaces being movable relative to each other;

first, second, and third electrical contacts disposed at first, second, and third locations of said first surface;

a fourth location on said second surface configured to cause one of said first, second, and third electrical contacts to exhibit an electrical characteristic which is recognizably distinct from the other two of said first, second, and third electrical contacts;

whereby the relative position of said first and second components is uniquely identified as a function of the one of said first, second, and third electrical contacts exhibiting said electrical characteristic which is recognizably distinct from the other two of said first, second, and third electrical contacts;

first, second, and third resilient members supported by said first component, said first, second, and third electrical contacts being attached, respectively to said first, second, and third resilient members; and a depression formed in said second surface, each of said first, second, and third electrical contacts being movable out of electrical contact with said second surface as a function of its associated one of said first, second, and third resilient members being moved into said depression to identify one of first, second, and third positions of said second component relative to said first component.

22. The position detector of claim 21, wherein:
said first component is generally cylindrical and slidably disposed within a generally cylindrical opening in said second component.

23. The position detector of claim 22, wherein:
said depression comprises a groove formed in said first surface.

24. The position detector of claim 21, wherein:
said first component is a piston slidably disposed within a cylindrical opening formed within said second member, said piston being movable in response to differential liquid pressure within said cylindrical opening on opposite sides of said piston, said piston is configured to exert a force on a shifting mechanism of a marine propulsion device.

25. The position detector of claim 24, further comprising:
a spring structure connected to said piston and configured to urge said piston to a central position wherein said fourth location on said second surface is generally aligned with said second location.

* * * * *